(12) United States Patent
Yamauchi et al.

(10) Patent No.: US 9,670,383 B2
(45) Date of Patent: Jun. 6, 2017

(54) HEAT SEALABLE LAMINATE AND METHOD FOR PRODUCING SAME

(75) Inventors: Kunio Yamauchi, Osaka (JP); Isao Iwaya, Nara (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

(21) Appl. No.: 13/984,359

(22) PCT Filed: Feb. 10, 2012

(86) PCT No.: PCT/JP2012/053166
§ 371 (c)(1),
(2), (4) Date: Aug. 8, 2013

(87) PCT Pub. No.: WO2012/108534
PCT Pub. Date: Aug. 16, 2012

(65) Prior Publication Data
US 2013/0323446 A1  Dec. 5, 2013

(30) Foreign Application Priority Data

Feb. 11, 2011 (JP) .................... 2011-027968

(51) Int. Cl.
*B05D 5/10* (2006.01)
*C09J 7/04* (2006.01)
(Continued)

(52) U.S. Cl.
CPC .......... *C09J 7/043* (2013.01); *B29C 47/0064* (2013.01); *B29C 47/025* (2013.01); *B32B 27/08* (2013.01);
(Continued)

(58) Field of Classification Search
CPC .................. B29C 47/92; B32B 27/00
See application file for complete search history.

(56) References Cited

U.S. PATENT DOCUMENTS 3,904,104 A * 9/1975 Kane ................ B32B 27/00
156/244.23
4,698,246 A * 10/1987 Gibbons et al. ............ 428/34.2
(Continued)

FOREIGN PATENT DOCUMENTS

JP       62-290534      12/1987
JP     2003/231224       8/2003
(Continued)

OTHER PUBLICATIONS

"International Search Report of PCT/JP2012/053166", mailing date is Apr. 24, 2012.
(Continued)

*Primary Examiner* — Xiao Zhao
(74) *Attorney, Agent, or Firm* — Greenblum & Bernstein, P.L.C.

(57) ABSTRACT

The present invention relates to a laminate comprising at least three layers, paper/polyethylene/polyethylene terephthalate, wherein the polyethylene terephthalate is directly coated on the polyethylene surface, with no adhesive layer or the like being interposed, and the polyethylene terephthalate layer has heat sealability; and a method for producing a laminate having polyethylene coated on at least one surface of a paper substrate, the method involving extrusion laminating polyethylene terephthalate onto a surface of the polyethylene, wherein an air gap expressed as the distance from a lip opening of a die to the polyethylene surface is 25 cm or less.

2 Claims, 1 Drawing Sheet

(51) Int. Cl.
  *B29C 47/02* (2006.01)
  *B32B 27/08* (2006.01)
  *B32B 27/10* (2006.01)
  *B32B 27/32* (2006.01)
  *B32B 27/36* (2006.01)
  *B65D 30/08* (2006.01)
  *B29C 47/00* (2006.01)
  *B29K 67/00* (2006.01)

(52) U.S. Cl.
  CPC .............. *B32B 27/10* (2013.01); *B32B 27/32* (2013.01); *B32B 27/36* (2013.01); *B65D 31/02* (2013.01); *B29C 47/0021* (2013.01); *B29K 2067/003* (2013.01); *B32B 2250/03* (2013.01); *B32B 2307/31* (2013.01); *B32B 2307/7246* (2013.01); *B32B 2307/7248* (2013.01); *B32B 2439/70* (2013.01); *Y10T 428/1352* (2015.01); *Y10T 428/264* (2015.01); *Y10T 428/2826* (2015.01)

(56) References Cited

U.S. PATENT DOCUMENTS

| | | | |
|---|---|---|---|
| 4,806,398 A | | 2/1989 | Martin |
| 4,913,760 A | * | 4/1990 | Benson et al. ............ 156/244.11 |
| 6,787,205 B1 | * | 9/2004 | Aho ..................... B32B 27/10 |
| | | | 156/244.11 |
| 2001/0046574 A1 | * | 11/2001 | Curtis ..................... B32B 27/10 |
| | | | 428/34.2 |
| 2012/0189790 A1 | | 7/2012 | Yamauchi et al. |

FOREIGN PATENT DOCUMENTS

| | | |
|---|---|---|
| JP | 2004-160763 | 6/2004 |
| JP | 2005-289472 | 10/2005 |
| JP | 2011-1087 | 1/2011 |

OTHER PUBLICATIONS

Swedish Office Action in regards to Swedish Application No. 1351045-8, dated May 26, 2014.

* cited by examiner

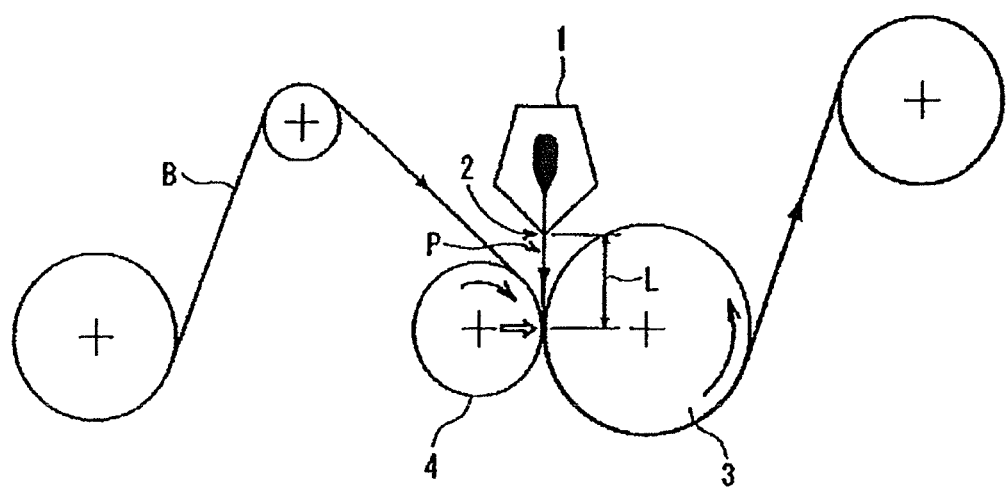

HEAT SEALABLE LAMINATE AND METHOD FOR PRODUCING SAME

TECHNICAL FIELD

This invention relates to a heat sealable laminate and a method for producing it. More specifically, the present invention relates to a laminate comprising at least three layers, namely, a paper substrate/polyethylene/polyethylene terephthalate, wherein the polyethylene terephthalate layer has heat sealability; and a method for producing the laminate.

BACKGROUND ART

Laminates having polyethylene coated on a paper substrate are used, for example, as containers for packaging in various fields such as foods.

However, polyethylene is excellent in water vapor barrier properties, but poor in gas barrier properties. To compensate for this nature, further lamination of polyethylene terephthalate having excellent gas barrier properties can be conceived as an excellent means of ensuring storage characteristics and aroma retaining properties for use in food packaging.

When the laminate is to be used as a base material for a packaging container, the outer layer of the laminate needs to have heat sealability. Conventional working methods, however, have used a stretched polyethylene terephthalate film, which is not heat sealable. For use as a base material for a packaging container, therefore, the laminate has required that a polyethylene layer be further coated on the polyethylene terephthalate layer by lamination or the like.

To laminate the stretched polyethylene terephthalate film, moreover, it is necessary to add an adhesive layer. Since the adhesive is used, however, this lamination method has involved the drawback of increasing the cost. Furthermore, the problem has been posed that an organic solvent or the like used in the adhesive remains.

Patent Document 1 discloses a working method which comprises adhering a polyethylene terephthalate layer and a polyethylene layer to a paper substrate without using the adhesive.

PRIOR ART DOCUMENTS

Patent Documents

Patent Document 1: JP-A-2011-1087

When the laminate described in the above document is used as a packaging container for a food, however, the food contacts the polyethylene layer, presenting a problem such as adsorption of an olefin odor and fragrance components from the polyethylene layer.

According to the above document, the stretched polyethylene terephthalate film is used to improve the gas barrier properties of the container itself. For this purpose, the step of adhesion to the paper substrate is necessary. Besides, the step of extruding polyethylene intended for heat sealing has to be added, thus additionally requiring two steps, and eventually producing a four-layered laminate. Hence, the method of the document is disadvantageous in that the manufacturing cost is difficult to reduce.

SUMMARY OF THE INVENTION

Problems to be Solved by the Invention

Under these circumstances, the present invention proposes a laminate comprising at least three layers, which is prepared by performing under specific conditions the melt extrusion lamination of polyethylene terephthalate onto a polyethylene surface coated on a paper substrate, without interposing an anchor coating agent or an adhesive, wherein the laminate retains heat sealability necessary as a packaging material, the laminate is excellent in long-term storage stability and aroma retaining properties, and since no adhesive layer is needed, an odor problem due to a residual solvent or the like is avoided.

It has generally been recognized that a polyolefin resin such as polyethylene, and an ester resin such as polyethylene terephthalate adhere to each other with difficulty because of differences in molecular functional groups, etc. Methods for joining both resins include a method of adhesion via an adhesive, and a method which comprises in-line application of an adhesive modified anchor coat as a pretreatment, and then melt extrusion laminating polyethylene thereon together with a combination of high ozonization and corona treatment.

None of the above-mentioned methods, however, solve the problem of the adhesive-associated residual solvent or the problem of the cost increase that have been mentioned above.

Means for Solving the Problems

The present invention involves extrusion laminating, under specific conditions, polyethylene terephthalate onto a two-layered laminate, which comprises polyethylene melt-extrusion-laminated onto a paper substrate, without requiring the step of applying an adhesive and a pretreated anchor coat onto the polyethylene surface. By so doing, the invention has enabled adhesion between polyethylene and polyethylene terephthalate.

The invention has also successfully obtained a uniform and stable film by melt extrusion laminating polyethylene terephthalate under specific conditions, and has made it possible to heat seal the polyethylene terephthalate surfaces to each other.

That is, a first aspect of the present invention is a heat sealable laminate characterized in that polyethylene is coated on at least one surface of a paper substrate, and polyethylene terephthalate is directly coated on the polyethylene coating.

In the first aspect of the present invention, it is preferred that 1. the polyethylene terephthalate be homopolyethylene terephthalate;
2. a film composed of the polyethylene terephthalate be applied by an extrusion lamination process;
3. the inherent viscosity of the polyethylene terephthalate be in the range of 0.72 to 0.88 dL/g; and
4. the film composed of the polyethylene terephthalate should have a thickness of 10 to 60 μm.

A second aspect of the present invention is a container formed by superposing the polyethylene terephthalate films of the heat sealable laminate, and heat-sealing them to each other.

A third aspect of the present invention is a method for producing a paper-based heat sealable laminate, comprising coating polyethylene on at least one surface of a paper substrate, and coating polyethylene terephthalate on the polyethylene film by an extrusion lamination process, characterized in that an air gap, expressed as a distance from a lip opening of a die to a surface of the polyethylene, is 25 cm or less.

In the third aspect of the present invention, it is preferred that the extrusion temperature of the polyethylene terephthalate during melt extrusion in the extrusion lamination process be in the range of Tm+25° C. or higher, but lower than Tm+70° C. based on the melting point (Tm) of the polyethylene terephthalate, and the extrusion pressure be in the range of 3.5 to 6.5 MPa.

Effects of the Invention

The heat sealable laminate of the present invention has been subjected to lamination without the use of an anchor coating agent or an adhesive. Thus, the laminate is free from an odor problem due to a residual solvent or the like. Moreover, the polyethylene terephthalate layer has heat sealability. Thus, a possible problem ascribed to a heat seal layer of polyolefin, such as adsorption of an olefin odor and fragrance components, is avoided, and excellent aroma retaining properties are ensured.

The heat sealable laminate of the present invention is also excellent in water vapor barrier properties and gas barrier properties. Moreover, the polyethylene terephthalate layer has heat sealability. Thus, the laminate can be formed into a container or the like by heat sealing, and the resulting container or the like is excellent in long-term storage characteristics required of a food packaging material.

Furthermore, with the method for producing a heat sealable laminate according to the present invention, polyethylene terephthalate is extrusion laminated under specific conditions, whereby a film can be formed uniformly and stably. Thus, paper/polyethylene/polyethylene terephthalate can be laminated without the use of an anchor coating agent or an adhesive, and the above laminate can be provided at a low cost.

BRIEF DESCRIPTION OF THE DRAWINGS

FIG. 1 is a schematic view showing the layout of an example of an apparatus used in the method for producing the laminate of the present invention.

MODE FOR CARRYING OUT THE INVENTION

In the laminate of the present invention, it is a principal feature that polyethylene is coated on at least one surface of a paper substrate, and polyethylene terephthalate is coated on the polyethylene surface by melt extrusion lamination, without an adhesive or the like being interposed.

(Polyethylene Terephthalate)

The polyethylene terephthalate (may hereinafter be referred to as "PET") consists essentially of a polyester which is formed by dehydration condensation of ethylene glycol as a diol component and terephthalic acid as a dicarboxylic acid component, and which has ester bonds connected together.

The formation of the ester bonds can be performed even by an ester interchange reaction with dimethyl terephthalate.

The polyethylene terephthalate for use in the laminate of the present invention is preferably homopolyethylene terephthalate which has general-purpose properties, which is inexpensive, and of which easy conditions are required.

This homopolyethylene terephthalate refers to general-purpose polyethylene terephthalate which is formed by polycondensation of ethylene glycol as a diol component and terephthalic acid as a dicarboxylic acid component, and which does not positively contain any other copolymerization component. The homopolyethylene terephthalate is not meant to exclude impurity components which occur as by-products during preparation of polyethylene terephthalate.

That is, "homo" in the homopolyethylene terephthalate is to the effect that a special polyester resin such as a copolyester resin or a blend resin is excluded. For example, Japanese Patent No. 3749000 names examples of special polyester resins.

It goes without saying that the "homopolyethylene terephthalate" as referred to in the present invention also includes one which intentionally incorporates a trace amount of a third component in regard to the technical scope of the present invention.

It is important in terms of film-forming properties that the inherent viscosity (IV) of the homopolyethylene terephthalate used in the laminate of the present invention be in the range of 0.72 to 0.88 dL/g, particularly 0.80 to 0.83 dL/g. If the inherent viscosity is lower than this range, the film-forming properties will be poor. If the inherent viscosity is higher than this range, poor extrudability will arise.

Further, the homopolyethylene terephthalate used in the laminate of the present invention can incorporate compounding agents for film publicly known per se, for example, anti-blocking agents, antistatic agents, lubricants, antioxidants, and ultraviolet absorbers, in accordance with publicly known formulations.

(Paper Substrate)

As the paper substrate used in the laminate, paperboards conventionally used in paper containers can all be used, and various forms of them can be adopted according to uses.

For example, ivory board, cup stock base paper, Manila board, cardboard, and synthetic paper can also be used, although these are not limitative.

The basis weight of the base paper or board used is not limited, but preferably, it is generally in the range of 180 to 500 g/m².

If the basis weight is less than this range, the mechanical strength of the resulting container may be inferior to that obtained using the above range. If the basis weight is greater than the above range, on the other hand, the resulting container is so heavy that its handle ability and economy may be poor and its formability may be inferior.

As will be described later, polyethylene is melt extrusion laminated onto the paper substrate, and polyethylene terephthalate is extrusion laminated thereon. On this occasion, in order to improve adhesion to polyethylene, it is preferred to subject the substrate to surface treatment such as corona discharge treatment, flame treatment, plasma processing, or ozonization.

(Coating of Polyethylene on Paper Substrate)

In the present invention, the laminate is produced by melt extrusion lamination of polyethylene (may hereinafter be referred to as "PE") onto the paper substrate, followed by melt extrusion lamination of polyethylene terephthalate onto a surface of the polyethylene.

The method of coating polyethylene on the paper substrate finds widespread use as a melt extrusion lamination process, and the production may be performed in accordance with such a process.

As the polyethylene laminated to the paper substrate, publicly known high-density polyethylene (HDPE), medium-density polyethylene (MDPE), low-density polyethylene (LDPE), and linear low-density polyethylene (LLDPE) can be used, without limitation, as long as any such polyethylene can be extrusion laminated to the paper substrate. The use of medium-density polyethylene or low-density polyethylene is preferred, because of their easy lamination onto the paper substrate.

To the coated surface of any such polyethylene, extrusion lamination of polyethylene terephthalate to be described later can be carried out.

The thickness of the polyethylene layer is not limited, but generally, a thickness of 10 to 60 µm is preferred.

(Surface Treatment of Polyethylene Layer)

In connection with the polyethylene surface of the paper substrate-polyethylene laminate, it is preferred to perform surface treatment in order to enhance the adhesiveness of polyethylene terephthalate during extrusion lamination to be described later. Concrete examples of the surface treatment are corona discharge treatment, ozonization, flame treatment, and plasma processing.

(Laminate)

In the present invention, the above-mentioned polyethylene terephthalate is extrusion laminated onto the polyethylene layer extrusion laminated to the paper substrate to complete the laminate.

Generally, polyethylene is excellent in water vapor barrier properties and chemical resistance, but is well known to be inferior in gas barrier properties and odor properties.

Polyethylene terephthalate, on the other hand, is excellent in gas barrier properties, but tends to be poor in water vapor barrier properties.

In the light of these facts, polyethylene and polyethylene terephthalate are laminated to the paper substrate, as stated above, whereby a laminate excellent in water vapor barrier properties and gas barrier properties can be constructed.

For the polyethylene terephthalate layer of the laminates by the conventional methods, a stretched film type of polyethylene terephthalate has been used. However, the stretched polyethylene terephthalate film does not retain heat sealability because of its crystallinity. Since the laminate having the stretched polyethylene terephthalate laminated therein is thus not heat sealable, it has failed to be shaped into a packaging material.

With the conventional laminates, therefore, the necessity of further laminating polyethylene onto the stretched polyethylene terephthalate layer by means of an adhesive or the like has arisen in order to impart heat sealability.

The laminate obtained by the present invention involves the polyethylene terephthalate surface which has heat sealability. Thus, it has become possible to form the laminate into a predetermined shape by heat sealing the polyethylene terephthalate surfaces to each other, without adding a further polyethylene layer.

It is to be noted that the laminate of the present invention is not limited to the three layers, paper/polyethylene/polyethylene terephthalate. For example, polyethylene may be coated on the other surface of the paper. What kind of layer should be added can be selected optionally depending on uses.

In the present invention, moreover, the respective layers can be joined together, without the use of an anchor coating agent or an adhesive. Hence, solutions can be provided to both of the problem of cost increases associated with the adhesive, etc. and the coating step, and the problem of an organic solvent or the like used in the anchor coating agent or the adhesive.

(Method for Producing Laminate)

In the method for producing the laminate of the present invention, it is necessary to coat the above-mentioned polyethylene terephthalate stably on the polyethylene surface of the paper/polyethylene laminate directly, without using an adhesive or the like.

For this purpose, it is important to select processing conditions in laminating a molten resin film of polyethylene terephthalate to the polyethylene surface of the paper/polyethylene laminate by the extrusion lamination process. Particularly, the distance from the lip opening of the die to the polyethylene surface of the paper/polyethylene laminate is of importance. That is, it is important to set the distance from the lip opening of the die to the surface of the polyethylene layer (i.e., air gap) at 25 cm or less, preferably at a value in the range of 5 to 20 cm.

Moreover, during extrusion of the molten resin from the extruder, it is preferred that the extrusion temperature of the molten resin extruded be generally set at a value in the range of Tm+25° C. or higher, but lower than Tm+70° C., based on the melting point (Tm) of the polyethylene terephthalate used.

Furthermore, the extrusion pressure during extrusion is preferably set at 3.5 to 6.5 MPa, particularly 4.0 to 6.0 MPa.

Preferably, the deviation of the actual measured temperature from each temperature setting should be small. Pressure adjustment as well should preferably be made precisely.

By setting the parameters in the above ranges, the occurrence of film shaking can be suppressed, and the laminate excellent in the uniformity of the film thickness and excellent in the adhesion of the coating can be produced, as stated earlier. These facts will become clear also from the results of the Examples to be described later.

That is, as clear from the results of the Examples to be described later, if the air gap is larger than 25 cm, selvage shaking, namely, bilateral shaking of both edges (selvages) of the film, occurs in a width of 4 mm or more, and the range of fluctuations in the film thickness is ±20% or more of the desired thickness, so that a film (PET layer) of a uniform thickness cannot be formed (Comparative Example 1, Table 1). Moreover, the heat sealability is also insufficient (Comparative Example 1, Table 5).

If the extrusion temperature of polyethylene terephthalate during melt extrusion deviates from the range of Tm+25° C. or higher, but lower than Tm+70° C., a coating of a uniform film thickness is difficult to form, and the resulting film is clearly inferior in selvage shaking to that fulfilling the above range (Comparative Examples 2 and 3, Table 2). If the extrusion pressure exceeds 6.5 MPa, moreover, the resulting film is clearly unsatisfactory in terms of selvage shaking and film thickness uniformity in comparison with that meeting the above range (Comparative Example 4, Table 3).

In the method for producing the laminate of the present invention which satisfies all of the above-mentioned conditions, by contrast, the width of selvage shaking is restricted to less than 4 mm, the range of fluctuations in the film thickness is as narrow as less than ±20% of the desired film thickness, and the adhesion is clearly excellent (Examples 1 to 19).

FIG. 1 is a schematic view of an example of an apparatus used in the method for producing the laminate of the present invention. Polyethylene terephthalate is melt-kneaded by an extruder (not shown), and extruded as a molten resin film P from lips 2 of a T-die 1 onto the polyethylene surface of a paper/polyethylene laminate B. Then, the composite is nipped between a chill roll 3 and a pressure roll 4, whereby the laminate of the present invention is produced. The air gap is expressed as the distance L from the lips 2 of the T-die to the polyethylene surface of the paper/polyethylene laminate B.

In the present invention, after the polyethylene terephthalate molten resin film P is extruded onto the polyethylene surface of the paper/polyethylene laminate B, the composite is nipped between the chill roll 3 and the pressure roll 4, as stated above. It is desirable on this occasion that the PET layer be quenched by the chill roll to suppress the crystallization of the polyethylene terephthalate. This enables the heat sealability of the polyethylene terephthalate layer to be ensured. The surface temperature of the chill roll is preferably in the range of nearly 10 to 50° C.

It is also important to maintain the extrusion pressure of the molten resin film at a constant value, and it is additionally desirable to provide a gear pump between the extruder and the die, although this is not illustrated.

As the die for extruding the polyethylene terephthalate, use can be made of a die generally used for extrusion lamination of resin. Preferably, the opening width of the die lips is in the range of 0.4 to 1.4 mm, and the width of the die is in the range of 90 to 180 cm.

Under the conditions of the present invention, moreover, lamination at a line speed of 50 to 100 m/min is preferred in terms of a uniform film thickness and the adhesion of the polyethylene terephthalate layer.

(Heat Sealability)

In the paper/polyethylene/polyethylene terephthalate laminate obtained by the present invention, the polyethylene terephthalate layer has heat sealability. Thus, the corresponding parts of the laminate, or the laminates, can be joined together by heat sealing the polyethylene terephthalate surfaces to each other.

(Container)

The laminate of the present invention can be formed into a container of a publicly known shape, such as a cup-shaped, tray-shaped or pouch-shaped one, by superposing the polyethylene terephthalate layers, and heat-sealing the superposed regions.

EXAMPLES

The present invention will be described by taking its examples. However, the present invention is in no way limited to the scope of these examples.

Example 1

(1) Lamination of Polyethylene to Paper

Low-density polyethylene (UBE Polyethylene C410 produced by Ube Industries, Ltd.; density: 0.918, melting point 108° C.) was extrusion laminated onto a cup stock base paper (basis weight 320 g/m$^2$) by a customary method to form polyethylene layers on both surfaces of the cup stock base paper. The coating thicknesses of the polyethylene layers were 40 μm and 60 μm.

(2) Lamination of Polyethylene Terephthalate to Paper/PE

The polyethylene surface with a coating thickness of 40 μm in the paper/polyethylene laminate was subjected to corona discharge treatment, and polyethylene terephthalate was extrusion laminated onto the treated polyethylene surface under the following conditions:

An air gap with respect to a die (width: about 110 cm) having a lip opening width adjusted to 0.8 mm (the air gap=the distance from the lip opening of the T-die to the polyethylene-laminated paper laminate) was set at 10 cm, and an extrusion pressure was set at 4.0 MPa. Under these conditions, homopolyethylene terephthalate at an extrusion temperature of 315° C. was extrusion laminated from the die onto the surface of the polyethylene layer (40 μm) of the paper/polyethylene laminate undergoing corona discharge treatment.

The polyethylene terephthalate used in Examples 1 to 14 and Comparative Examples 1 to 5 was homopolyethylene terephthalate, which was a resin having an inherent viscosity of 0.83 dL/g and a melting point of 250° C. (NOVAPEX BK6180, produced by Mitsubishi Chemical Corp.).

The coating thickness of the polyethylene terephthalate was 30 μm, and the coating line speed was 63 m/min. Simultaneously with the coating onto the paper/polyethylene laminate, the composite was passed between a chill roll (surface temperature: 35° C.) and a nip (rubber) roll to complete a paper/polyethylene/polyethylene terephthalate laminate. In connection with these steps, the state of the extruded laminate was evaluated. To investigate the conditions for extrusion, etc., moreover, experiments were conducted, with the air gap, the extrusion temperature, and the extrusion pressure being varied as follows:

Examples 2 to 5, Comparative Example 1

The same procedure as in Example 1 was performed, except that the air gap was set at the distances shown in Table 1. The state of the extruded laminate was evaluated. The results are shown in Table 1.

Example 6

The same procedure as in Example 1 was performed, except that the air gap was set at 15 cm and that the extrusion temperature of the homopolyethylene terephthalate was set at 280° C. The state of the extruded laminate was evaluated. The results are shown in Table 2.

Examples 7 to 9, Comparative Examples 2 to 3

The same procedure as in Example 6 was performed, except that the extrusion temperature of the polyethylene terephthalate was set at the temperatures shown in Table 2. The state of the extruded laminate was evaluated. The results are shown in Table 2.

Example 10

The same procedure as in Example 1 was performed, except that the air gap was set at 15 cm and that the extrusion pressure was set at 3.5 MPa. The state of the extruded laminate was evaluated. The results are shown in Table 3.

Examples 11 to 15, Comparative Example 4

The same procedure as in Example 10 was performed, except that the extrusion pressure was set at the pressures shown in Table 3. The state of the extruded laminate was evaluated. The results are shown in Table 3.

Evaluation Methods

1. Selvage Shaking Width of the Laminated Film
   ○ . . . Selvage shaking width of within 2 mm
   Δ . . . Selvage shaking width of less than 4 mm
   x . . . Selvage shaking width of 4 mm or more
   The laminate with a selvage shaking width of less than 4 mm can be put to practical use.
2. Uniformity of the Film Thickness
   ○ . . . The range of fluctuations in the film thickness of the PET layer was within ±15% of the desired film thickness.

Δ . . . The range of fluctuations in the film thickness of the PET layer was less than ±20% of the desired film thickness.

x . . . The range of fluctuations in the film thickness of the PET layer was equal to or more than ±20% of the desired film thickness.

The laminate with a range of fluctuations of less than ±20% can be put to practical use.

3. Adhesion

◯ . . . There was sufficient adhesion between the PET layer and the polyethylene layer.

Δ . . . There was adhesion between the PET layer and the polyethylene layer.

x . . . In some cases, slight peeling occurred between the PET layer and the polyethylene layer.

The laminate without peeling between the PET layer and the polyethylene layer can be put to practical use.

4. Heat Sealability

In connection with each of the laminates obtained in Examples 1 to 15 and Comparative Examples 1 to 2, the polyethylene terephthalate-laminated surfaces were superposed, and a heating plate adjusted to each of heat-sealing temperatures of 160° C., 170° C., 190° C. and 220° C. was held at a pressure of 2 kg/cm² for 2 seconds by an impulse sealer, to heat-seal the laminate.

Then, the heat-sealed surfaces of the laminate subjected to heat sealing were stripped, and the state of breakage with respect to the paper substrate was observed. Evaluation criteria are as follows:

◎ . . . Breakage at the paper substrate surface was 90% or more of the welded area ◯ . . . Breakage at the paper substrate surface was 60% or more, but less than 90% of the welded area Δ . . . Breakage at the paper substrate surface was 30% or more, but less than 60% of the welded area x . . . Breakage at the paper substrate surface was less than 30% of the welded area The results are shown in Table 5.

TABLE 1

|  | Air gap (cm) | Selvage shaking width of laminated film | Uniformity of film thickness | Adhesion |
|---|---|---|---|---|
| Ex. 2 | 5 | ◯ | Δ | ◯ |
| Ex. 1 | 10 | ◯ | ◯ | ◯ |
| Ex. 3 | 15 | ◯ | ◯ | ◯ |
| Ex. 4 | 20 | ◯ | ◯ | ◯ |
| Ex. 5 | 25 | Δ | Δ | Δ |
| Comp. Ex. 1 | 30 | X | X | Δ |

(Extrusion temperature: 315° C., Extrusion pressure: 4.0 MPa)

TABLE 2

|  | Extrusion temperature (° C.) | Selvage shaking width of laminated film | Uniformity of film thickness | Adhesion |
|---|---|---|---|---|
| Comp. Ex. 2 | 270 | Δ | Δ | X |
| Ex. 6 | 280 | ◯ | ◯ | Δ |
| Ex. 7 | 290 | ◯ | ◯ | ◯ |
| Ex. 8 | 300 | ◯ | ◯ | ◯ |
| Ex. 9 | 315 | ◯ | ◯ | ◯ |
| Comp. Ex. 3 | 325 | Δ | Δ | ◯ |

(Air gap: 15 cm, Extrusion pressure: 4.0 MPa)

TABLE 3

|  | Pressure (MPa) | Selvage shaking width of laminated film | Uniformity of film thickness | Adhesion |
|---|---|---|---|---|
| Ex. 10 | 3.5 | ◯ | ◯ | ◯ |
| Ex. 11 | 4.0 | ◯ | ◯ | ◯ |
| Ex. 12 | 4.5 | ◯ | ◯ | ◯ |
| Ex. 13 | 5.0 | ◯ | ◯ | ◯ |
| Ex. 14 | 5.5 | ◯ | ◯ | ◯ |
| Ex. 15 | 6.0 | Δ | Δ | ◯ |
| Comp. Ex. 4 | 6.5 | Δ | Δ | Δ |

(Air gap: 15 cm, Extrusion temperature: 315° C.)

TABLE 4

|  | Pressure | Selvage shaking width of laminated film | Uniformity of film thickness | Adhesion |
|---|---|---|---|---|
| Ex. 16 | 4.0 | ◯ | ◯ | ◯ |
| Ex. 17 | 4.0 | ◯ | ◯ | ◯ |
| Ex. 18 | 4.0 | ◯ | ◯ | ◯ |
| Ex. 19 | 4.0 | ◯ | ◯ | ◯ |

(Air gap: 15 cm, Extrusion temperature: 315° C.)

TABLE 5

|  | PET surface/PET surface | | | |
|---|---|---|---|---|
|  | 160° C. | 170° C. | 190° C. | 220° C. |
| Ex. 1 | ◎ | ◎ | ◎ | ◎ |
| Ex. 2 | ◎ | ◎ | ◎ | ◎ |
| Ex. 3 | ◎ | ◎ | ◎ | ◎ |
| Ex. 4 | ◎ | ◎ | ◎ | ◎ |
| Ex. 5 | Δ | ◯ | ◎ | ◎ |
| Ex. 6 | ◯ | ◯ | ◎ | ◎ |
| Ex. 7 | ◎ | ◎ | ◎ | ◎ |
| Ex. 8 | ◎ | ◎ | ◎ | ◎ |
| Ex. 9 | ◎ | ◎ | ◎ | ◎ |
| Ex. 10 | ◎ | ◎ | ◎ | ◎ |
| Ex. 11 | ◎ | ◎ | ◎ | ◎ |
| Ex. 12 | ◎ | ◎ | ◎ | ◎ |
| Ex. 13 | ◎ | ◎ | ◎ | ◎ |
| Ex. 14 | ◎ | ◎ | ◎ | ◎ |
| Comp. Ex. 1 | X | X | Δ | ◯ |
| Comp. Ex. 2 | Δ | Δ | ◯ | ◎ |

As shown in Table 5, when the polyethylene terephthalate surfaces were heat sealed, satisfactory adhesion was observed in all of the Examples.

Examples 16 to 19

The polyethylene terephthalate resins used were homopolyethylene terephthalate having an inherent viscosity of 0.88 dL/g and a melting point of 250° C. (NEH-2070, produced by UNITIKA, LTD.) (Example 16), homopolyethylene terephthalate having an inherent viscosity of 0.80 dL/g and a melting point of 236° C. (BR8040, produced by SK Chemicals Co., Ltd.) (Example 17), homopolyethylene terephthalate having an inherent viscosity of 0.76 dL/g and a melting point of 252° C. (TRN-8550FF, produced by Teijin Chemicals Ltd.) (Example 18), and homopolyethylene terephthalate having an inherent viscosity of 0.72 dL/g and a melting point of 251° C. (NES-2040, produced by UNITIKA, LTD.) (Example 19).

The extrusion conditions were exactly the same as those in Example 1. Under these conditions, laminates were prepared in the same manner as in Example 1, and their heat sealability evaluations were made in the same manner as in Example 1. The results are shown in Table 6.

TABLE 6

| | PET surface/PET surface | | | |
|---|---|---|---|---|
| | 160° C. | 170° C. | 190° C. | 220° C. |
| Ex. 16 | ◉ | ◉ | ◉ | ◉ |
| Ex. 17 | ◉ | ◉ | ◉ | ◉ |
| Ex. 18 | ◉ | ◉ | ◉ | ◉ |
| Ex. 19 | ◉ | ◉ | ◉ | ◉ |

In all of Examples 16 to 19, when the polyethylene terephthalate surfaces were heat sealed, satisfactory adhesion was exhibited.

INDUSTRIAL APPLICABILITY

The heat sealable laminate of the present invention is excellent in water vapor barrier properties and gas barrier properties. Moreover, the polyethylene terephthalate layer has heat sealability. Thus, the laminate is excellent in long-term storage characteristics and aroma retaining properties, and can be used preferably as a food packaging material.

According to the method for producing the laminate of the present invention, the three-layered laminate of the composition Paper/polyethylene/polyethylene terephthalate can be provided at a low cost, without the use of an anchor coating agent or an adhesive. The laminate, therefore, can be utilized preferably for the production of general-purpose packaging materials.

EXPLANATIONS OF LETTERS OR NUMERALS

1 Die, 2 Lip, 3 Chill roll, 4 Pressure roll

The invention claimed is:

1. A method for producing a paper-based heat sealable laminate, comprising:

coating polyethylene on at least one surface of a paper substrate, and coating polyethylene terephthalate on a film of the polyethylene by an extrusion lamination process by using an extruder, wherein:

the polyethylene terephthalate is a homopolyethylene terephthalate having an intrinsic viscosity of 0.72 to 0.88 dL/g, the polyethylene is a low-density polyethylene, and the surface of the film has been treated, an air gap, expressed as a distance from a lip opening of a T-die of the extruder to a surface of the coating of the polyethylene, is 25 cm or less, an extrusion temperature of the homopolyethylene terephthalate during melt extrusion in the extrusion lamination process is in a range of not lower than Tm+25° C. but lower than Tm+70° C., based on a melting point (Tm) of the homopolyethylene terephthalate, the extrusion pressure is in a range of 3.5 to 6.5 MPa, and, after the extrusion lamination with the homopolyethylene terephthalate, the laminate coated with the homopolyethylene terephthalate is cooled by the cooling rolls.

2. The method according to claim 1, wherein the coated polyethylene terephthalate has a thickness of 10 to 60 μm.

* * * * *